United States Patent [19]

Heiles et al.

[11] Patent Number: 5,579,310
[45] Date of Patent: Nov. 26, 1996

[54] METHOD FOR SWITCHING THROUGH DIGITAL SIGNALS

[75] Inventors: Jürgen Heiles, München; Franz-Otto Hamborg, Berlin; Hans-Otto Kersten, Berlin; Horst Wild, Berlin, all of Germany

[73] Assignee: Siemens Aktiengesellschaft, Munich, Germany

[21] Appl. No.: 256,560

[22] PCT Filed: Jan. 11, 1993

[86] PCT No.: PCT/DE93/00008

§ 371 Date: Jul. 14, 1994

§ 102(e) Date: Jul. 14, 1994

[87] PCT Pub. No.: WO93/14582

PCT Pub. Date: Jul. 22, 1993

[30] Foreign Application Priority Data

Jan. 15, 1992 [DE] Germany ............... 42 00 864.6

[51] Int. Cl.$^6$ ................................... H04Q 11/04
[52] U.S. Cl. ................. 370/60; 370/82; 370/94.1
[58] Field of Search .................. 370/84, 110.1, 370/58.1, 60, 112, 99, 53, 58.2, 60.1, 77, 79, 82, 83, 94.1, 94.2, 105.1; 340/825.06, 825.52

[56] References Cited

U.S. PATENT DOCUMENTS

| 3,207,851 | 9/1965 | Fukinuki ............................ 370/10 |
| 5,005,171 | 4/1991 | Modisette, Jr. et al. ............ 370/84 |
| 5,123,010 | 6/1992 | Pospischil ........................ 370/58.1 |
| 5,144,297 | 9/1992 | Ohara ................................ 370/84 |
| 5,267,239 | 11/1993 | Pospischil et al. .............. 370/84 |

FOREIGN PATENT DOCUMENTS

| 0222544 | 5/1987 | European Pat. Off. . |
| 0407851 | 1/1991 | European Pat. Off. . |
| 3819259 | 12/1989 | Germany . |

OTHER PUBLICATIONS

"U.S. Forging Ahead With Sonet Despite B-ISDN Standard Setback", P. Heywood et al, Data Communications, vol. 16, No. 13, Dec. 1987, New York, pp. 64–68.

"Die Organisation von Datennetzen", James Martin, Carl Hanser Verlag, Muenchen 1972, p. 33.

"General Aspects of Digital Transmission Systems; Terminal Equipments", CCITT International Telecommunication Union, Blue Book (excerpts), vol. III, Recommendations G.700–G.795, 9th Plenary Assembly, Melbourne, Nov. 1988, pp. 122–125.

*Primary Examiner*—Alpus H. Hsu
*Assistant Examiner*—Ricky Q. Ngo
*Attorney, Agent, or Firm*—Hill, Steadman & Simpson

[57] ABSTRACT

In this method for switching through digital signals (DS) of the synchronous digital hierarchy (SDH) or of the plesiochronous digital hierarchy (PDH), the digital signals are inserted into cross-connect base pulse frames (PR1). Said pulse frame comprises 9 lines (Z) and 100 columns (S). The through-connect data words transmitted each comprise 9 bits and are composed of 8 bits of meaningful information and one bit of additional information. Higher-order pulse frames (PRN) can be formed by interlacing a plurality of cross-connect base pulse frames (PR1).

6 Claims, 6 Drawing Sheets

METHOD FOR SWITCHING THROUGH DIGITAL SIGNALS

BACKGROUND OF THE INVENTION

In the digital communication network according to CCITT Recommendations G. 709, the digital signals to be transmitted are inserted into special data function blocks called containers. These are extended by adding additional information (POH) to form virtual containers VC-n and can in turn be combined again to form "tributary units" TU-n or higher-order virtual containers and administrative units, and can be transmitted, inserted into a synchronous transport module STM-1, on the 155-Mbit/s level (or a higher level). The administrative or tributary units are switched through via switching networks (cross-connectors) in the form of special data blocks (cross-connect data blocks). In addition to the meaningful information (payload), data for switching path addresses, processor information, error control, alarm signals, etc. are also to be transmitted. The pulse frame of the STM-1 signal does not have the additional transmission capacity required for these data.

A method for switching through multiplexed signals via cross-connectors is known from European Patent Application EP-A3-0 407 851 (corresponding to U.S. Pat. No. 5,123,010. However, the pulse frame used therein permits only the transmission of a small amount of special information.

SUMMARY OF THE INVENTION

The object of the invention is to state a method for switching through digital signals suitable for the synchronous digital hierarchy.

This object is achieved by a method of the present invention for switching through digital signals wherein the digital signals re inserted into DSM pulse frames which have (in two-dimensional representation) in each case 9 lines and up to 100 N columns. It is possible to transmit a DSM data word comprising 9 bits in every position of a column, of which an octet comprising 8 bits is used for transmitting the digital signal.

Advantageous further developments of the invention are are as follows.

A further bit for transmitting monitoring and control information is provided for each octet of the digital signal. A DSM base pulse frame comprises 9 lines and 100 columns. Higher-order DSM pulse frames are generated by column-by-column interlacing of DSM base pulse frames.

Digital signals having higher data rates of the synchronous digital hierarchy are distributed over a plurality of DSM base pulse frames. The STM-1 signal and each DSM pulse frame have the same period length. The ratio of the system clock frequencies of the STM-1 frames and the DSM base pulse frames is 12 to 5. Four successive DSM-N pulse frames form one DSM multiframe.

The cross-connect base pulse frame (DSM base pulse frame) according to the invention for inserting a through-connect signal DSM comprises 9 lines and 100 columns with 9-bit words at each column position. The frame has a repetition time of 125 µs. Four successive DSM base pulse frames form one multiframe.

The frame structure adapted to the signals of the synchronous digital hierarchy is advantageous. Thus, the number of lines matches, while the number of columns was extended.

The transmission rate of the DSM base pulse frame is 64.8 Mbit/s. Modules for this transmission rate can be produced with the CMOS-ASIC technology currently available. DSM-N signals with n-times the transmission rate can be generated by multiplexing DSM-1 signals column-by-column and are transmitted in corresponding DSM-N pulse frames.

Signals of the synchronous digital hierarchy (or else plesiochronous signals inserted therein) having higher data rates are divided into a plurality of signals, which are then transmitted in a plurality of DSM base pulse frames.

The repetition rate of the pulse frames is 8 kHz, which corresponds to a repetition time of 125 µs. The ratio of system clocks (bit clocks) of the STM-1 pulse frame transmitted in the synchronous digital hierarchy and of the DSM base pulse frame is 12:5. This makes it readily possible to derive the one system clock from the other one. Even in the case of higher-order pulse frames which have the same repetition time, there is a simple system clock frequency ratio.

It is possible to form higher-order pulse frames having a multiple number of columns in a simple manner from the DSM base pulse frame, for example by interlacing column-by-column. The ninth bit appended to an octet of the STM-1 signal in each case can be used for data protection or for transmitting additional data. The further additional data are transmitted in the columns not required by the meaningful information (payload) of the SDH signals.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

The invention will be explained in greater detail with reference to figures, in which.

DESCRIPTION OF THE PREFERRED EMBODIMENT

Figure 1:
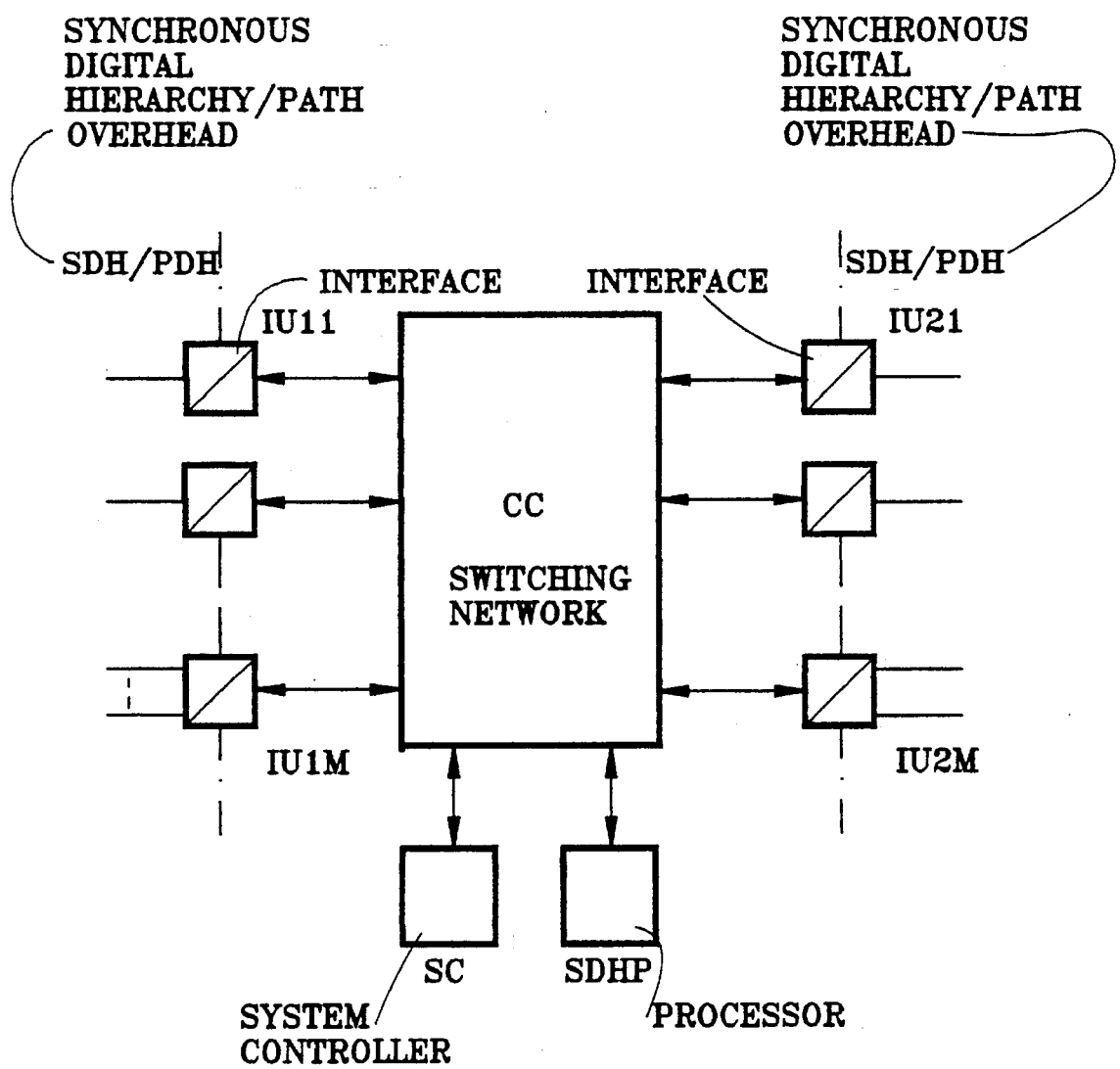
FIG. 1 shows a switching network (cross-connector)

FIG. 1 represents a switching network (cross-connector) CC which serves to switch through DSM-1 signals. The digital signals of the synchronous digital hierarchy SDH or of the plesiochronous digital hierarchy PDH are converted into through-connect signals DSM-1 by special interface circuits IU11 to IU1M and IU21 to IU2M. To do this, for example, an STM-1 signal of the SDH is converted into three DSM-1 signals, or a plurality of digital signals DS2 having a lower data rate are first inserted into containers, converted into tributary units, for example TU-12, converted into the base pulse frames of the DSM-1 signal and switched through to the switching network. The interface circuits IU therefore frequently contain additional demultiplexers or multiplexers.

A system controller SC handles the central control of the switching network and an SDH processor SHDP handles the evaluation of the SDH overhead, or its addition to the user data respectively.

Figure 2:
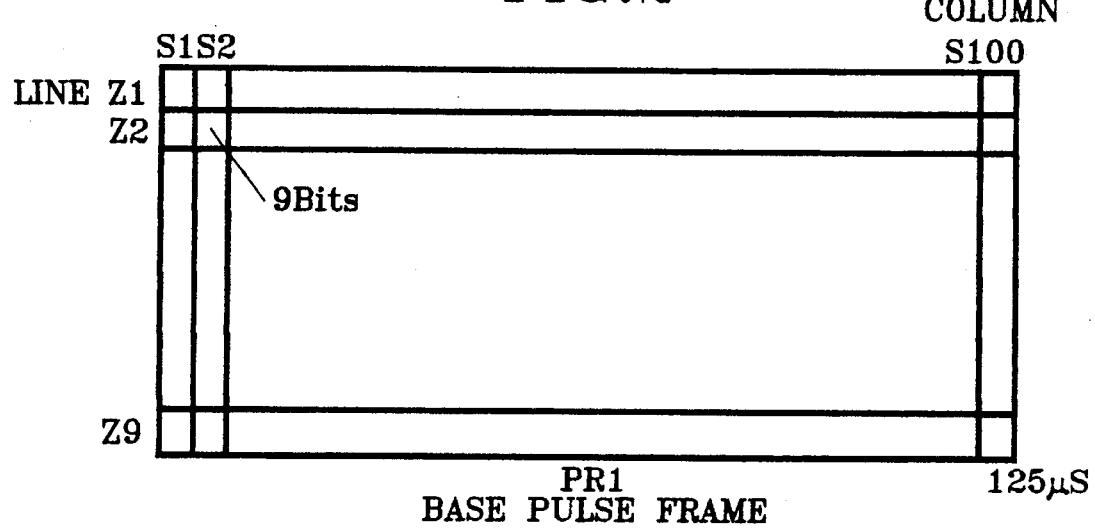
FIG. 2 shows the frame structure of a DSM base pulse frame.

The DSM-1 base pulse frame PR1 is represented in FIG. 2. It comprises 9 lines Z1 to Z9 and 100 columns S1 to S100. One DSM word 9 bits long can be transmitted in each column of a line. Said word comprises an octet (byte) of a digital signal and an additional bit. The latter can be used for data protection for example. The DSM-1 signal transmitted in the DSM-1 base block has a data rate of 64.8 Mbit/s. A plurality of columns of the DSM base pulse frame not required to transmit meaningful information can be used to transmit additional data.

Figure 3:
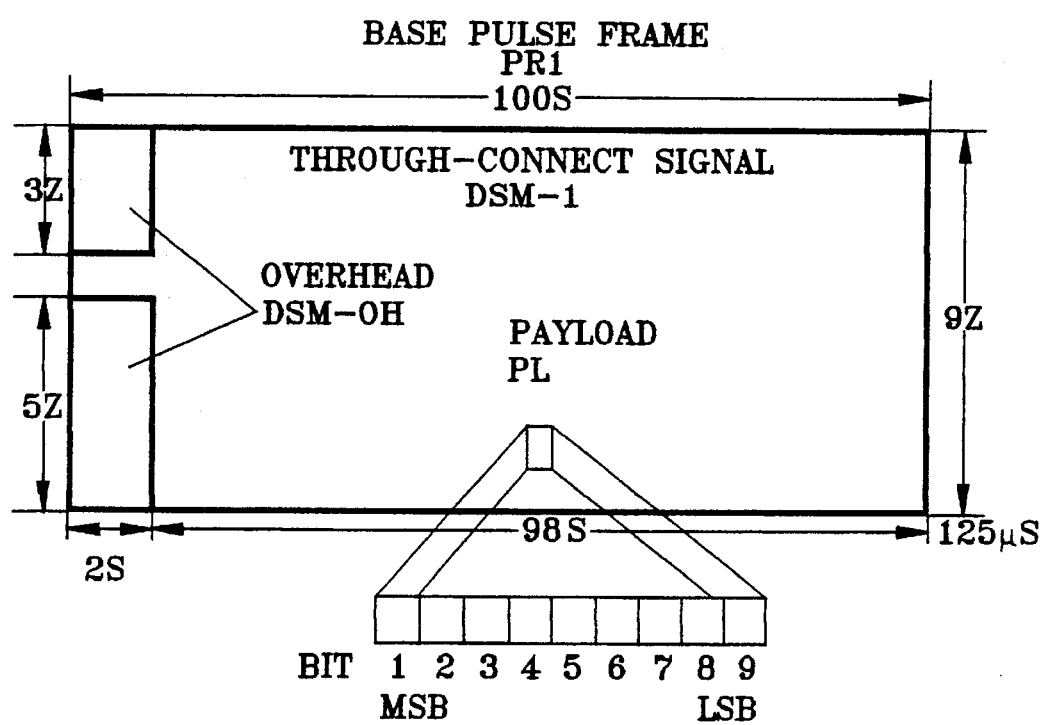
FIG. 3 shows the structure of a DSM-1 pulse frame.

FIG. 3 shows the structure of a DSM-1 base pulse frame PR1 with the DSM overhead DSM-OH serving for control purposes. Of one data word of the meaningful information field (payload area) PL, for example the eight first bits are used for the meaningful information and the ninth bit LSB is used to transmit error control information for monitoring the functioning of the cross-connector.

Figure 4:
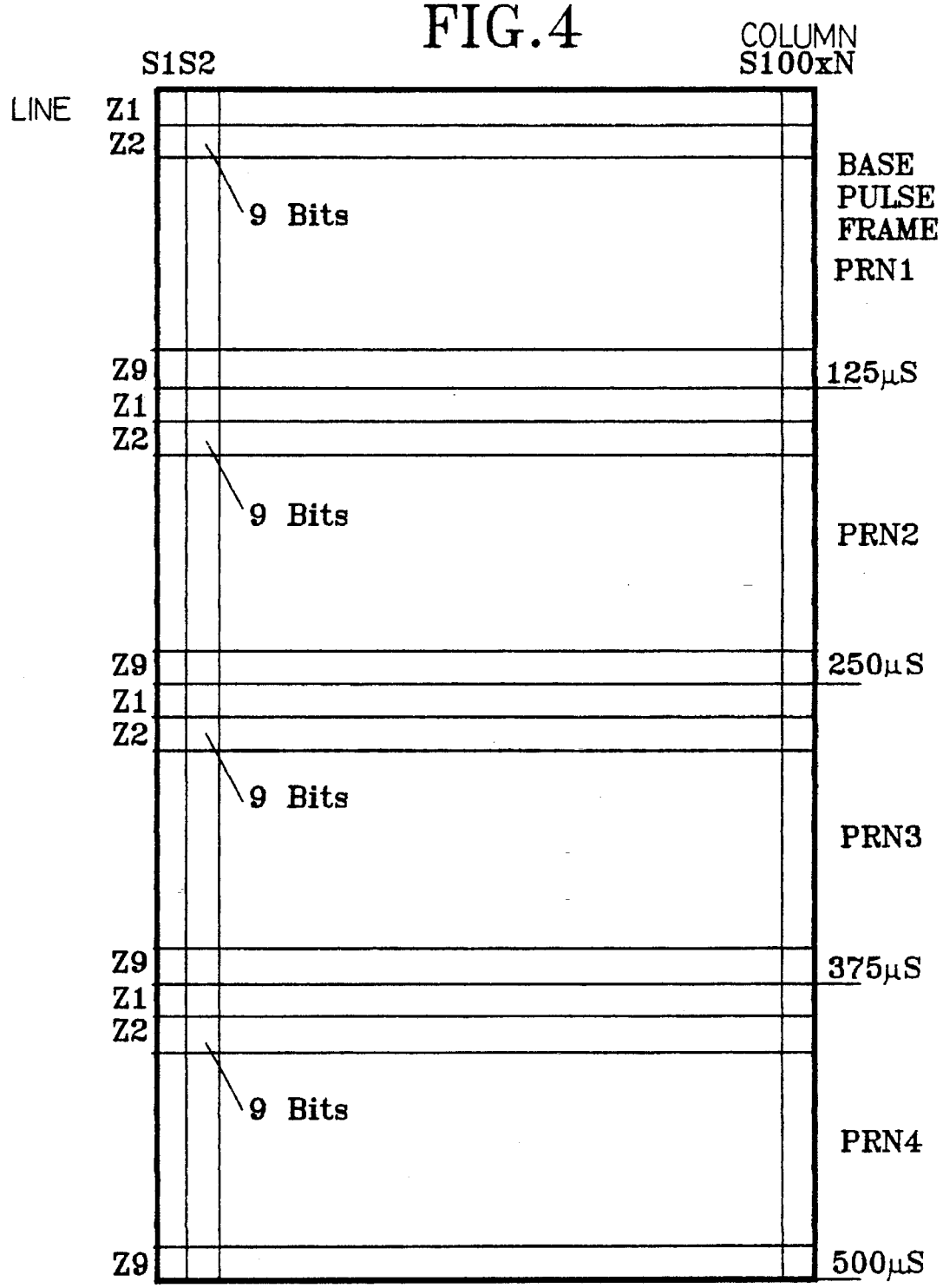
FIG. 4 shows the structure of a DSM-N pulse frame.

FIG. 4 represents a higher-order DSM-N pulse frame PRN (N>2). Said pulse frames have in each case an integer multiple of the columns of a DSM base pulse frame PR1.

In accordance with the multiframe structure of the tributary units, four successive DSM-N pulse frames PRN1 to PRN4 form a DSM-N multiframe.

Figure 5:
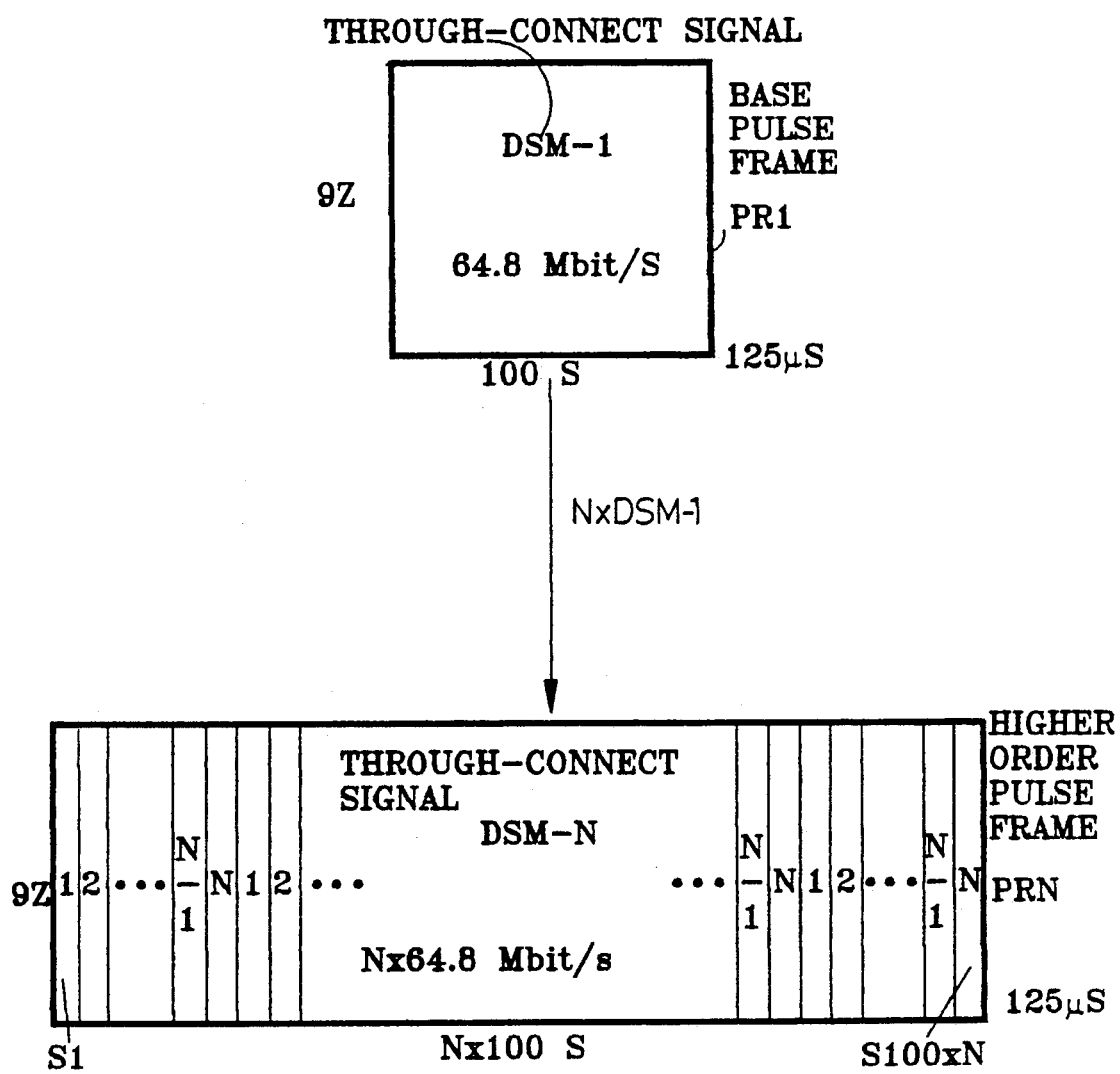
FIG. 5 shows the structure of a higher-order DSM pulse frame.

FIG. 5 represents the formation of a higher-order pulse frame PRN by interlacing N DSM-1 signals. The DSM-1 signals arranged in DSM base pulse frames PR1 are interlaced with one another word-by-word. Thus, the first DSM data word of the first DSM-1 signal is inserted into the first column S1 of the PRN pulse frame, then the first DSM data word of the second DSM-1 signal, and so forth until the first data word of the (N–1)th DSM-1 signal has been inserted into the (N–1)th column and then the Nth DSM-1 signal has been inserted into the Nth column. Following this, the second data words of the first line are inserted until finally the DSM-1 signals have been interlaced column-by-column in the DSM-N pulse frame PRN.

Figure 6:
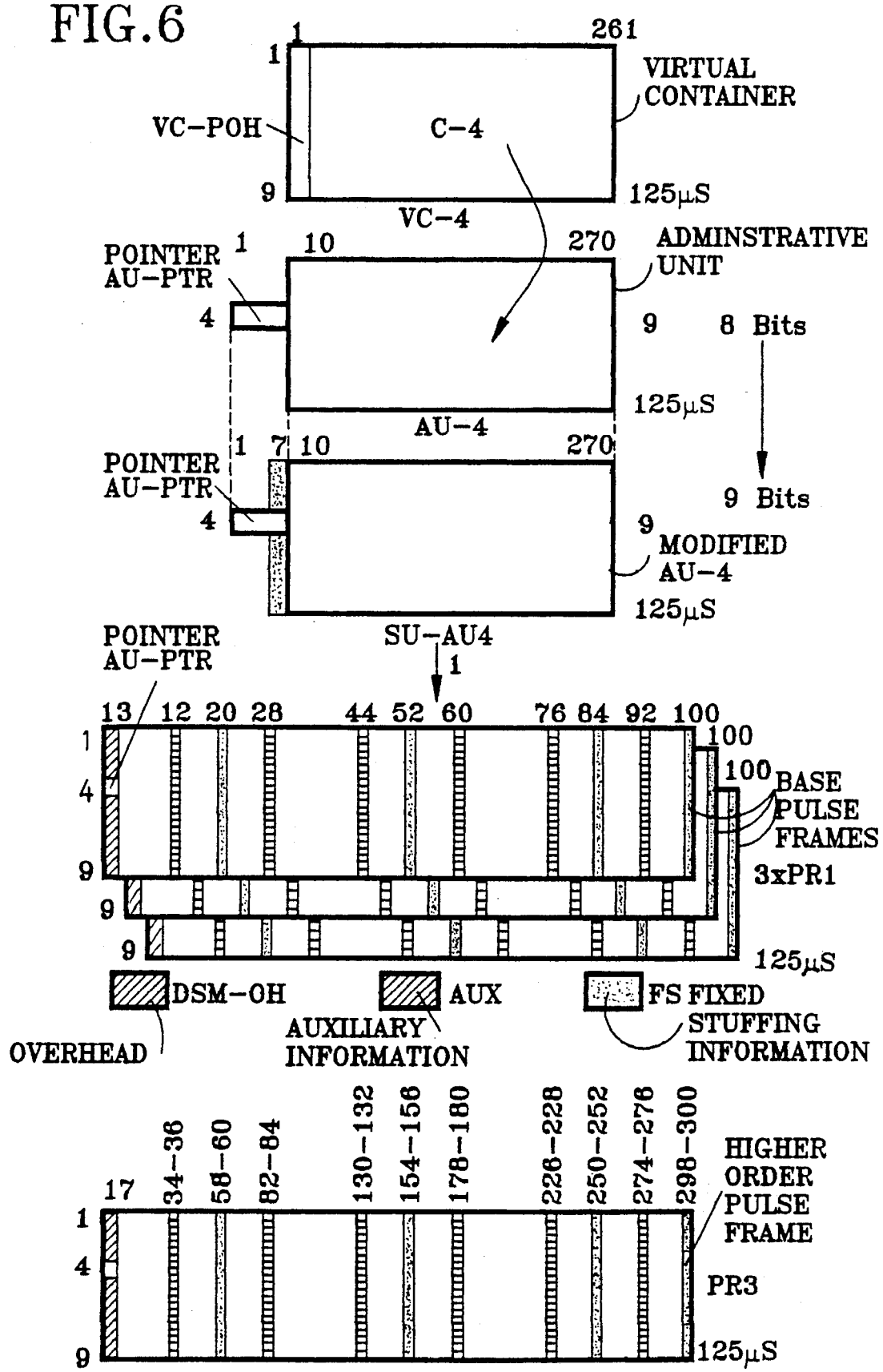
FIG. 6 shows the insertion of C-4 signals into DSM-1 and DSM-3 pulse frames.

FIG. 6 represents the insertion of a container C-4 into three DSM base pulse frames. After the formation of an administrative unit AU4 and addition of the ninth bit, the modified administrative unit SU-AU4 with DSM data words and a pointer AU-Ptr, the data are distributed over three DSM base pulse frames PR1. Four columns are provided with fixed stuffing information FS. Six columns are provided for transmitting additional information. It is of course also possible to select another arrangement of the columns for transmission of the additional information (auxiliary information) AUX. The three DSM base pulse frames are in turn combined to form a DSM-3 pulse frame PR3 by word-by-word or column-by-column interlacing.

Figure 7:
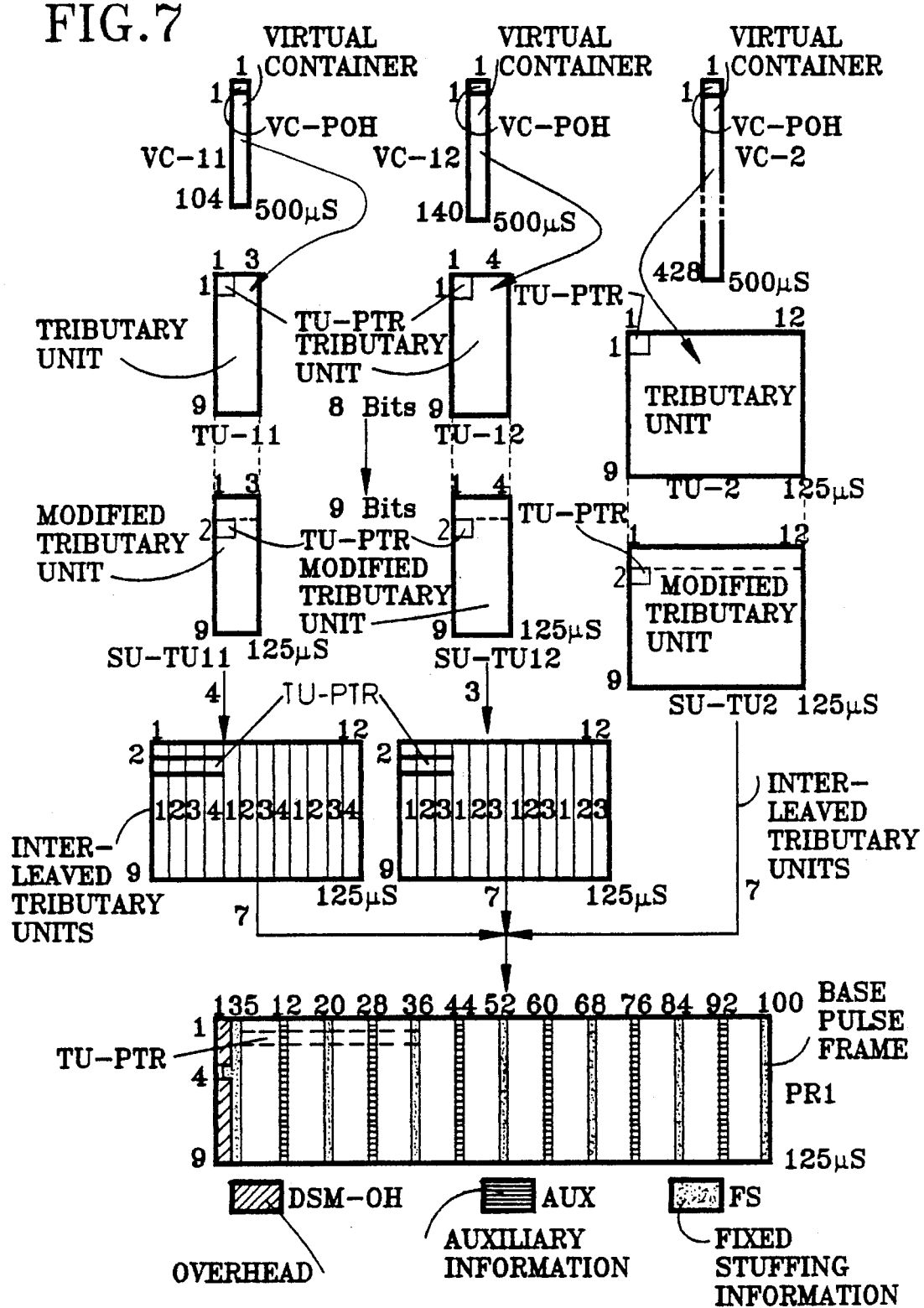
FIG. 7 shows the insertion of virtual containers into DSM-1 pulse frames.

As a further example, FIG. 7 represents the insertion of virtual containers VC-11, VC-12 and VC-2 into a DSM base pulse frame PR1. The virtual containers VC are inserted (mapped) into tributary units TU, one pointer PTR being added. Following this one bit is added to each octet, producing the modified tributary units SU-TU. A plurality of said tributary units SU-TU are interlaced with one another word-by-word (word interleaved), with the end result of producing a column-by-column interlacing of the different tributary units. The format of the data blocks produced in this manner largely corresponds to the tributary unit SU-TU2.

These function blocks with the same or different structures—depending on which virtual containers have been combined—can now be "mapped into" a DSM base pulse frame. This is again accomplished by word-by-word interlacing, so that the result is always that the function blocks are interlaced column-by-column again in a DSM base pulse frame.

The structure of the function data block produced corresponds to that of an SDH function block TUG-3.

The procedures represented in FIG. 6 and FIG. 7 are to be considered only examples. It is thus also possible, for example, for an AU-3, a TU-3 or 96 columns of additional information to be transmitted in a DSM base pulse frame. It is also possible to perform a plurality of transformations of the data function blocks simultaneously.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for switching digital signals through a switching network, comprising the steps of:

inserting the digital signals into cross-connect pulse frames, each of the cross-connect pulse frames having 9 lines and 100.N columns in a two-dimensional representation, where N is a whole number greater than zero, each of the 9 lines of each of the columns containing a through-connect data word having 9 bits, of which an octet having 8 bits is used for inserting the digital signals and of which the ninth bit is used for transmission information, monitoring information and control information; and transmitting the through-connect data words through said switching network, wherein said 8 bits of said through-connect data words are used for representing said digital signals in said cross-connect pulse frames.

2. The method as claimed in claim 1, wherein the method further comprises using cross-connect base pulse frames, each having 9 lines and 100 columns, and generating higher-order cross-connect pulse frames by column-by-column interlacing of said cross-connect base pulse frames.

3. The method as claimed in claim 2, wherein the digital signals are inserted into a plurality of cross-connect base pulse frames.

4. The method as claimed in claim 2, wherein each cross-connect base pulse frame has a common period length.

5. The method as claimed in claim 4, wherein a period length of each cross-connect base pulse frame is 125 µs.

6. The method as claimed in claim 1, wherein the method further comprises forming a cross-connect multiframe using four successive cross-connect base pulse frames.

* * * * *